(12) United States Patent
Shinnaka et al.

(10) Patent No.: US 10,271,700 B2
(45) Date of Patent: Apr. 30, 2019

(54) STORAGE FACILITY FOR OBJECT OF PAYING OF RESPECTS

(71) Applicant: Daifuku Co., Ltd., Osaka-shi (JP)

(72) Inventors: Hidenobu Shinnaka, Tokyo (JP); Haruhito Furuya, Tokyo (JP); Wataru Kiyokawa, Tokyo (JP); Hideki Sato, Tokyo (JP); Yukinori Kameda, Tokyo (JP); Kazuya Arima, Tokyo (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/925,981

(22) Filed: Mar. 20, 2018

(65) Prior Publication Data

US 2018/0271342 A1  Sep. 27, 2018

(30) Foreign Application Priority Data

Mar. 22, 2017 (JP) ................. 2017-055646

(51) Int. Cl.
| | |
|---|---|
| *A47L 9/06* | (2006.01) |
| *E04H 13/00* | (2006.01) |
| *B65G 1/04* | (2006.01) |
| *B65G 1/06* | (2006.01) |
| *B08B 5/04* | (2006.01) |
| *E06B 9/24* | (2006.01) |
| *B65G 45/00* | (2006.01) |

(52) U.S. Cl.
CPC ............. *A47L 9/0606* (2013.01); *B08B 5/04* (2013.01); *B65G 1/0421* (2013.01); *B65G 1/06* (2013.01); *E04H 13/006* (2013.01); *B65G 1/0435* (2013.01); *B65G 45/00* (2013.01); *E06B 9/24* (2013.01); *E06B 2009/2464* (2013.01)

(58) Field of Classification Search
CPC ....... A47L 9/0606; B65G 1/0435; B65G 1/06; B65G 1/0421; E04H 13/006; E06B 9/24; E06B 2009/2464
See application file for complete search history.

(56) References Cited

U.S. PATENT DOCUMENTS

| | | | | |
|---|---|---|---|---|
| 3,160,263 A | * | 12/1964 | Lewis ................. | B65G 19/225 198/719 |
| 4,201,347 A | * | 5/1980 | Elkin ....................... | B02C 7/08 241/100 |
| 4,688,359 A | * | 8/1987 | See ....................... | A61G 17/08 52/104 |
| 4,739,595 A | * | 4/1988 | Yamagata .............. | E04H 13/00 312/33 |

(Continued)

FOREIGN PATENT DOCUMENTS

JP    2002235459 A    8/2002

*Primary Examiner* — Joshua K Ihezie
(74) *Attorney, Agent, or Firm* — The Webb Law Firm (57) ABSTRACT

A storage facility for objects of paying of respects includes a cleaning device which utilizes a dust removing member to remove dust from an outer surface of an object of paying of respects. The dust removing member is provided at a position that allows the dust removing member to act on an outer surface of an object of paying of respects that is being moved in a transport direction through transport operation by the transport system such that the dust removing member is in relative motion, in a direction opposite to the transport direction, with respect to the object of paying of respects as the object of paying of respects is moved in the transport direction.

8 Claims, 6 Drawing Sheets

(56) References Cited

U.S. PATENT DOCUMENTS

| | | | | | |
|---|---|---|---|---|---|
| 4,862,655 | A | * | 9/1989 | LePage | E04H 13/005 52/136 |
| 5,195,812 | A | * | 3/1993 | Eickhof | A47B 47/0091 312/257.1 |
| 5,477,594 | A | * | 12/1995 | LePage | E04H 13/006 211/194 |
| 7,926,228 | B1 | * | 4/2011 | Snow | E04H 13/008 27/35 |
| 2007/0054058 | A1 | * | 3/2007 | Starcevich | B28B 11/04 427/421.1 |
| 2008/0116772 | A1 | * | 5/2008 | Champagne | A47F 3/005 312/117 |
| 2010/0139060 | A1 | * | 6/2010 | Leeder | E04H 13/008 27/1 |
| 2011/0044792 | A1 | * | 2/2011 | Talley | B65G 1/0407 414/807 |
| 2013/0019544 | A1 | * | 1/2013 | Ng | E04H 13/00 52/133 |
| 2013/0086779 | A1 | * | 4/2013 | Florea | A61G 17/08 27/1 |
| 2013/0199111 | A1 | * | 8/2013 | Eickhof | E04H 13/006 52/134 |
| 2013/0332563 | A1 | * | 12/2013 | Yuen | G06Q 99/00 709/217 |
| 2014/0182096 | A1 | * | 7/2014 | Jairala, Jr. | A61G 17/08 27/1 |
| 2015/0052830 | A1 | * | 2/2015 | School | E04H 13/006 52/134 |
| 2015/0252583 | A1 | * | 9/2015 | Dvorak | E04H 13/006 52/103 |
| 2017/0211291 | A1 | * | 7/2017 | Eickhof | A61G 17/08 |
| 2018/0209164 | A1 | * | 7/2018 | Rossi | E04H 13/006 |

* cited by examiner

STORAGE FACILITY FOR OBJECT OF PAYING OF RESPECTS

CROSS-REFERENCE TO RELATED APPLICATION

This application claims priority to Japanese Patent Application No. 2017-055646 filed Mar. 22, 2017, the disclosure of which is hereby incorporated in its entirety by reference.

FIELD OF THE INVENTION

The present invention relates to a storage facility for object of paying of respects comprising a plurality of storage sections each configured to store an object of paying of respects, and a transport system configured to transport an object of paying of respects between any of the plurality of storage sections and a respects-paying area which includes an area for a person, visiting to pay respects, to pay respects.

BACKGROUND ART

An example of a storage facility for object of paying of respects is described in JP Publication of Application No. 2002-235459 (Patent Document 1). More specifically, Patent Document 1 discloses a columbarium system in which a plurality of containers (2) for holding funerary urns (1) are stored in a storage device (A) and in which, when a visitor visits to pay respects, a desired container (2) is taken out of the storage device (A) and transported by a transport device (C) to a respects-paying area (B) where the person visiting to pay respects awaits. A nameplate (5) on which the deceased's name, etc., is written is attached to an outer surface of each container (2). And the person pays respects while looking at the nameplate (5) of the container (2) transported to the respects-paying area (B). Thus, in the arrangement disclosed in Patent Document 1, each container (2) in which a funerary urn (1) is held is used as an object of paying of respects.

SUMMARY OF THE INVENTION

Incidentally, in a storage facility for object of paying of respects such as one described above, objects of paying of respects are used in the facility for a relatively a long period of time; thus, dust tends to accumulate on outer surfaces (especially on the top surface) of an object of paying of respects. And because of its function as an object of paying of respects, it is not preferable for an object of paying of respects to be seen by a person (visiting to pay respects) with dust accumulating on its outer surfaces. Even when dust is not visible to a person visiting to pay respects, it is not preferable, from a viewpoint of maintaining dignity of the deceased, to have dust accumulating on an outer surface of an object of paying of respects. However, there is no statement about this point in Patent Document 1.

Thus, a storage facility for object of paying of respects is desired in which it is possible to reduce accumulation of dust on an outer surface of an object of paying of respects with a relatively simple arrangement.

A storage facility for objects of paying of respects in accordance with the present disclosure comprises a plurality of storage sections each configured to store an object of paying of respects; a transport system configured to transport an object of paying of respects between any of the plurality of storage sections and a respects-paying area which includes an area for a person, visiting to pay respects, to pay respects; a cleaning device which utilizes a dust removing member to remove dust from an outer surface of an object of paying of respects; and wherein the dust removing member is provided at a position that allows the dust removing member to act on an outer surface of an object of paying of respects that is being moved in a transport direction through transport operation by the transport system such that the dust removing member is in relative motion, in a direction opposite to the transport direction, with respect to the object of paying of respects as the object of paying of respects is moved in the transport direction.

With the arrangement described above, the dust removing member provided at the position that allows it to act on an outer surface of an object of paying of respects is arranged to be in relative motion, in the direction opposite to the transport direction, with respect to the object of paying of respects as the object of paying of respects is caused to pass by the location of the dust removing member in the transport direction. Thus, the transporting of the object of paying of respects by the transport system can be made use of effectively to remove dust from an outer surface of an object of paying of respects. In this process, it is not necessary to move the dust removing member in the direction opposite to the transport direction. And even when the dust removing member is arranged to be moved, the amount of required movement can be made relatively small; thus, it is possible to remove dust from an outer surface of an object of paying of respects with a relatively simple arrangement.

Note that, with the arrangement described above, it is necessary to transport an object of paying of respects in order to remove dust from an outer surface of the object of paying of respects. However, at least when a person is visiting to pay respects, a corresponding object of paying of respects is transported from a storage section to a respects-paying area, and is transported to a storage section from the respects-paying area when the person finishes paying respects. Thus, dust can be removed from an outer surface of an object of paying of respects taking advantage of such a transporting opportunity. That is, although a small amount of dust may accumulate on an outer surface of an object of paying of respects while being stored in a storage section, such dust can be removed every time a person visits to pay respects. At least when a person visits to pay respects, likelihood of having an object of paying of respects with dust accumulated on an outer surface thereof can be reduced.

As such, with the arrangement described above, a storage facility for objects of paying of respects can be provided in which it is possible to reduce accumulation of dust on an outer surface of an object of paying of respects with a relatively simple arrangement.

DETAILED DESCRIPTION OF EMBODIMENTS

First Embodiment

Figure 1:
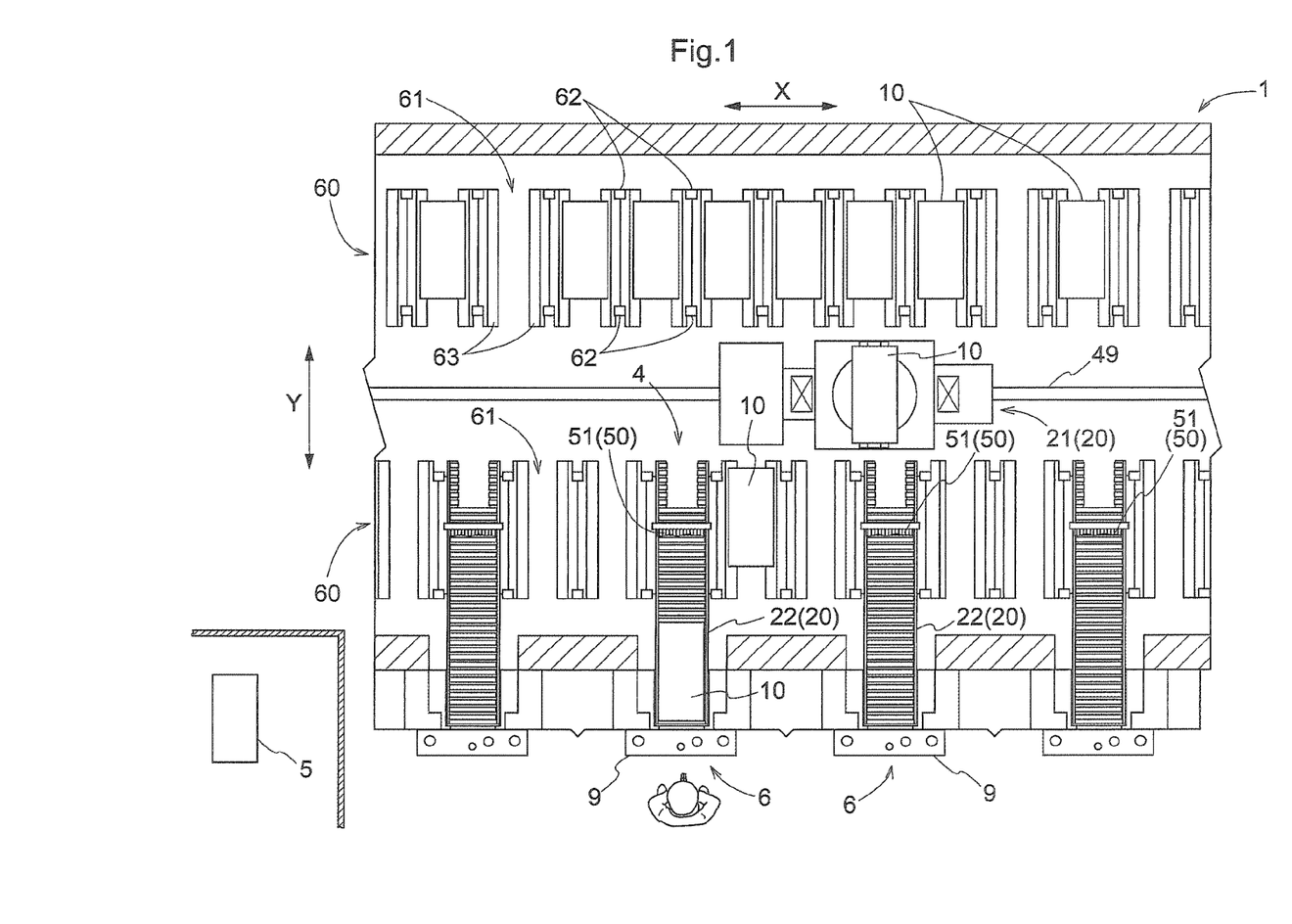
FIG. 1 is a plan view of a storage facility for objects of paying of respects in accordance with the first embodiment.
Figure 2:
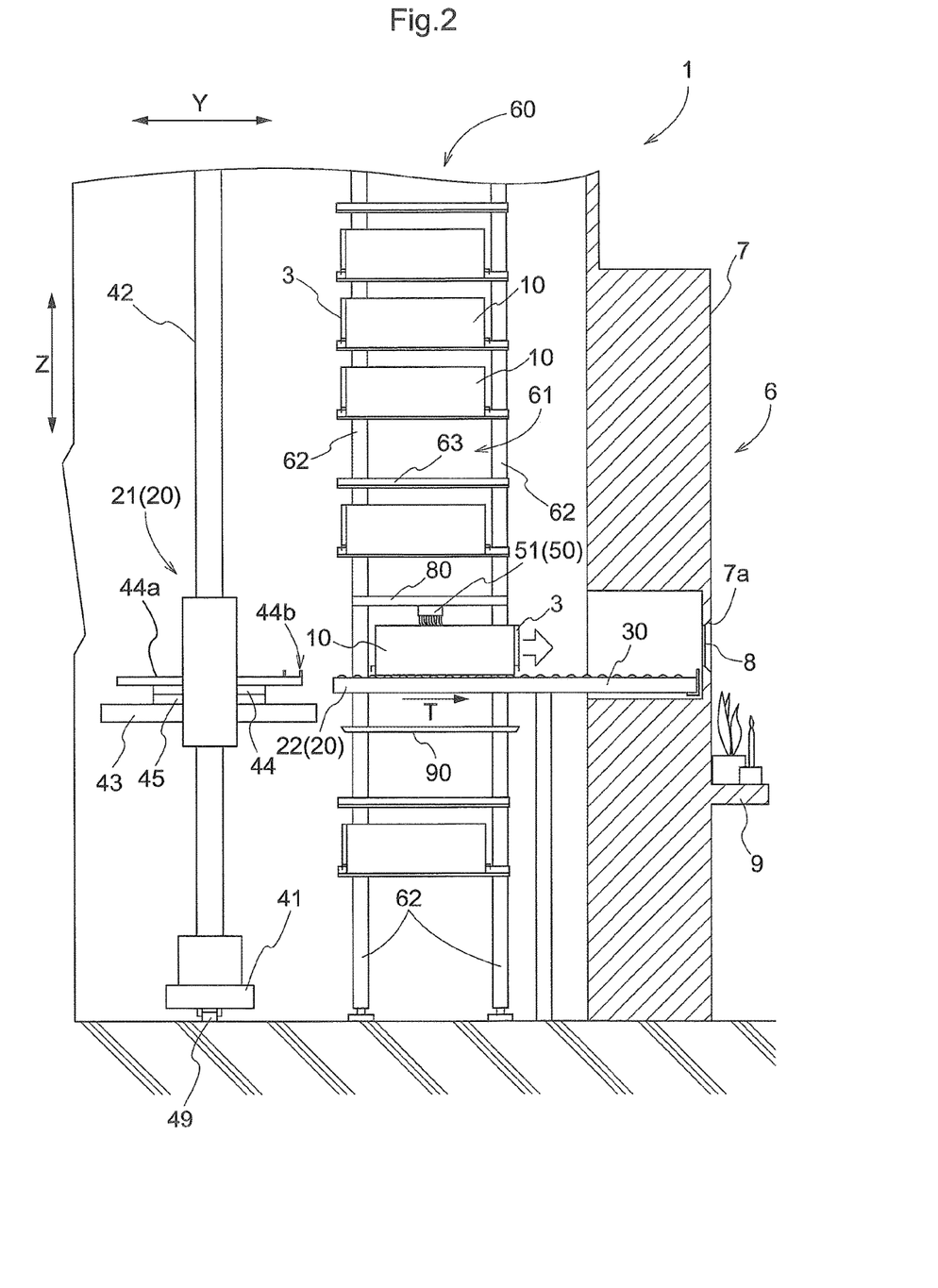
FIG. 2 is a side view of the storage facility for objects of paying of respects in accordance with the first embodiment.
Figure 3:
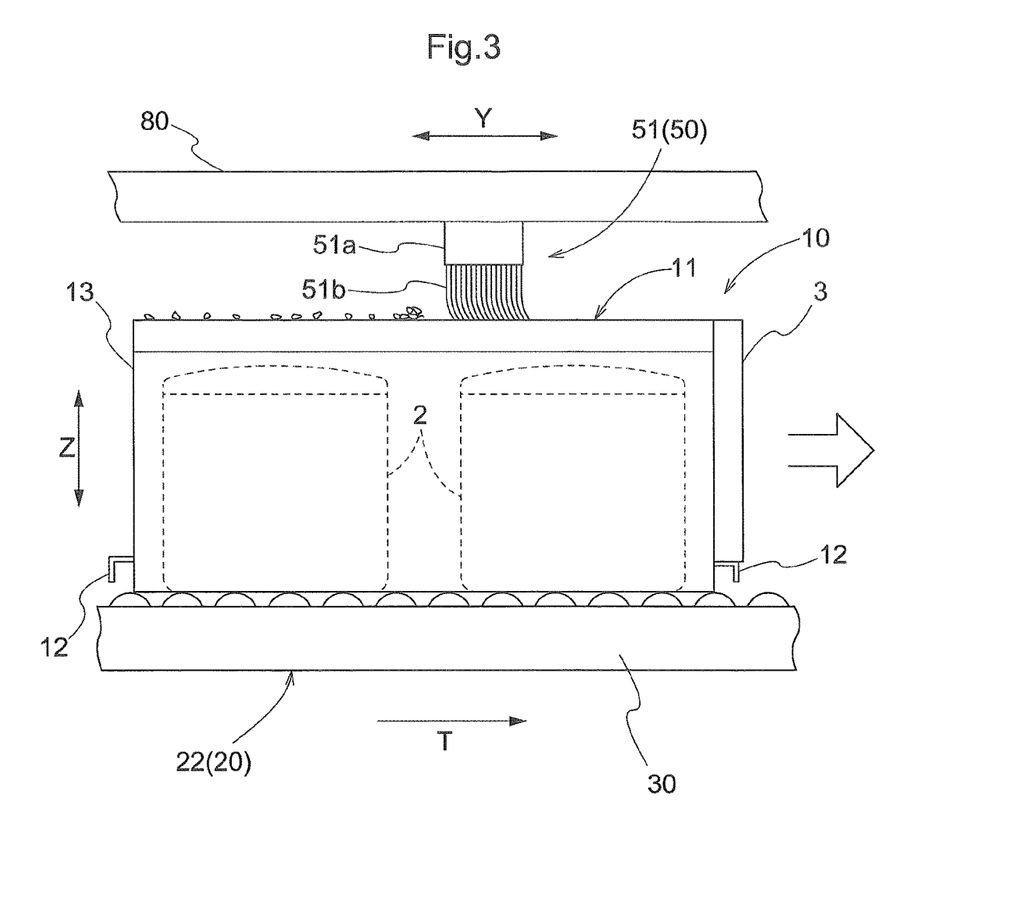
FIG. 3 shows how a cleaning device in accordance with the first embodiment operates.

The first embodiment of a storage facility for objects of paying of respects is described with reference to the attached drawings (FIGS. 1-3). As shown in FIG. 1, a storage facility for object of paying of respects (referred to hereinafter simply as the storage facility 1) is a facility which includes a plurality of storage sections each configured to store one or more objects of paying of respects, and transport devices 20 configured to transport an object 10 of paying of respects between any of the plurality of storage sections 61 and any of respects-paying areas 6 each of which includes an area in which a person (visiting to pay respects) pays respects. That is, the storage facility 1 is a facility which people visit to pay respects. Note that, as can be understood from the description below each respects-paying area 6 also includes an area for an object of paying of respects which includes an area surrounding an object of paying of respects when such object of paying of respects is brought and placed close to the corresponding opening 7a of a panel 7; thus, each respects-paying area 6 includes an area intended for a person visiting to pay respects to be oriented toward when paying respects. As such, each respects-paying area 6 includes a respects-paying portion which includes a support portion described below as well as a portion that can provide an area for a person (visiting to pay respects) to pay respects, among other things that may be described to be provided in a respects-paying area. In the present embodiment, as shown in FIGS. 1 and 2, each storage rack 60 includes a plurality of storage sections 61 arranged in horizontal rows of storage sections 61 with one horizontal row located above another along a vertical direction Z and in vertical rows of storage sections 61 with one vertical row located next to another along a horizontal direction. In the description below, the direction (horizontal direction) along which a plurality of storage sections 61 is arranged in each horizontal row is referred to as a rack lateral direction X whereas a horizontal direction which is perpendicular to the rack lateral direction X is referred to as a rack depth direction Y.

As shown in FIG. 3, each object 10 of paying of respects is a container (container for religious purposes) that can, or configured to, hold one or more funerary urns (as housed objects 2 (detailed below)) containing, or for containing, cremated remains. And each object 10 of paying of respects includes a portion 13 (having a generally box-shape and thus referred to as a box-shape portion) which forms and defines the accommodating space in which one or more housed objects 2 are held. The outer surfaces of each object 10 of paying of respects are formed by its box shape portion 13. The box-shape portion 13 is generally formed to be rectangular parallelepiped in shape, and has a bottom wall portion, a top wall portion located above the bottom wall portion, and four side wall portions which connect the bottom wall portion and the top wall portion to each other. And a main body portion with an opening at the top is formed by the bottom wall portion and four side wall portions. And the top wall portion functions as a lid for closing and leaving open the opening. The box-shape portion 13 is formed, for example, of metal (stainless steel etc.). Engaged portions 12 are provided on side surfaces (vertical outer surfaces 11) of the box-shape portion 13 with each engaged member 12 shaped to form a gap between itself and a corresponding side surface such that the space formed by the gap opens downward. One engaged member 12 is provided on a side surface while the other engaged member 12 is provided on the opposite side surface. With such engaged members 12, it is possible to horizontally move an object 10 of paying of respects by inserting an engaging member of a device (hook 44b of a transfer device 44 described below in the present embodiment) or fingers of a person when storing and retrieving the object 10 of paying of respects in and out of a storage location for an object 10 of paying of respects such as a storage section 61.

A funerary urn, as a housed object 2, may contain cremated remains such as cremated pieces of bone of a deceased person or pet (referred to hereinafter simply as "cremated remains"). The housed object 2 can also be a container other than a funerary urn, such as a bag containing cremated remains. In addition, a housed object 2 (or object or material contained in a housed object 2) may be something other than cremated pieces of bone and may be ashes of the deceased person or pet (referred to hereinafter simply as "ashes"), a manufactured object containing cremated pieces of bone and/or ashes (for example, a mortuary tablet, a religious statue such as that of Buddha, etc.), a manufactured object containing no cremated pieces of bone or ashes (for example, a mortuary tablet, a religious statue, such as, that of Buddha, Christ or Mary, etc.), or an article which is left by, or reminds of, the deceased or pet, etc., or any combination thereof.

Attached to the box-shape portion 13 is a member 3 that is generally plate-shaped (i.e., member generally flat and thin (length and width greater than thickness) thus referred to as a plate-shaped member) with information related to the housed object 2 shown thereon. As shown in FIG. 3, the plate-shaped member 3 is attached to a (front) side surface of the box-shape portion 13 with the plate-shaped member 3 supported from below by the engaged member 12. The plate-shaped member 3 is formed, for example, of or from, a slab of stone, or stone material. The information related to the housed object 2 is expressed by a set of characters, one or more designed figures, one or more symbols, or a combination thereof. And the information is carved, printed, etc., so that it is visible on a surface of the plate-shaped member 3 (i.e., on an outward surface when the plate-shaped member 3 is attached to the box-shape portion 13). Examples of the information related to the housed object 2 include the deceased's family name, the deceased's family crest or symbol, the deceased's favorite words or saying.

As shown in FIGS. 1 and 2, each storage rack 60 includes a plurality of support columns 62 extending along the vertical direction Z, and a plurality of support arms 63 (each of which includes a generally-plate-shaped member (member generally flat and thin (length and width greater than thickness))) extending along, i.e., parallel to, the rack depth direction X. Each support arm 63 is fixed to each of a pair of support columns 64 that are adjacent each other along the rack depth direction Y. The storage sections 61 are divided into individual sections by the support columns 64 along the rack lateral direction X and by the support arms 63 along the vertical direction Z. As shown in FIG. 1, each object 10 of paying of respects is stored in a storage section 61 with the object 10 being supported by a pair of support arms 63 that are spaced apart from each other along the rack lateral direction X. Each storage section 61 is configured to store one object 10 of paying of respects.

The storage facility 1 includes a controller 5 configured to control operation of the transport devices 20. And when commanded by the controller 5, the transport devices 20 transport an object 10 of paying of respects (that the person P visiting to pay respects intends to see) from a storage section 61 to a respects-paying area 6 and also transport the object 10 of paying of respects from the respects-paying area 6 to a storage section 61 after the person finishes the paying of respects. The transport devices 20 include a first transport device 21 and second transport devices 22 so configured that an object 10 of paying of respects can be transferred between the first transport device 21 and any of the second transport devices 22. The first transport device 21 transports an object 10 of paying of respects between a storage section 61 and any of the second transport devices 22 whereas each second transport device 22 transports an object 10 of paying of respects between the first transport device 21 and the respects-paying area 6 that corresponds to the second transport device 22. Therefore, the first transport device 21 and any of the second transport devices 22 are considered to form a transport system configured to transport an object 10 of paying of respects between any of the plurality of storage sections 61 and a respects-paying area 6. The transporting path of an object 10 of paying of respects being transported by the first transport device 21 extends in front of each storage rack 60 and along the rack lateral direction X. The first transport device 21 moves along the rack lateral direction X in front of each storage rack 60 to transport an object 10 of paying of respects to or from a storage section 61. As shown in FIG. 1, two storage racks 60 are provided and positioned to face each other across the transporting path of the first transport device 21. And the first transport device 21 is configured to be capable of transferring an object 10 of paying of respects to and from any storage section 61 of either of the storage racks 60. The transporting path of an object 10 of paying of respects being transported by any of the second transport devices 22 extends along the rack depth direction Y. And designated at one end of the transporting path (the end portion along the rack depth direction Y and on the side of the transporting path of the first transport device 21) is a relay area 4 in which an object 10 of paying of respects is transferred between the first transport device 21 and the second transport device 22. And designated on the other end of the transporting path (the end portion along the rack depth direction Y and on the side away from the transporting path of the first transport device 21) is a part of the corresponding respects-paying area 6 and is a container support location provided in the corresponding respects-paying area 6. The storage facility 1 is provided with a plurality of respects-paying areas 6. And a plurality of second transport devices 22, one for each of the plurality of respects-paying areas 6, are provided.

As shown in FIGS. 1 and 2, the first transport device 21 is a stacker crane. More specifically, the first transport device 21 includes a travel member 41 configured to travel while being guided by a rail 49 installed on a floor surface, a mast 42 arranged vertically on the travel member 41, a vertically movable member 43 which can be raised and lowered (or movable along the vertical direction Z) while being guided by the mast 42, and a transfer device 44 supported by the vertically movable member 43. The transfer device 44 includes a support member 44a for supporting an object 10 of paying of respects from below, and is configured to transfer an object 10 of paying of respects between the support member 44a and a transfer target location, such as a storage section 61 and a second transport device 22 (or a relay area 4 thereof). More specifically, as shown in FIG. 2, the transfer device 44 has a hook 44b (an example of an engaging member) configured to releasably engage the engaged member 12 (see FIG. 3) provided to each object 10 of paying of respects, and is configured to transfer an object 10 of paying of respects between the support member 44a and a transfer target location by projecting and retracting the hook 44b along transfer direction (rack depth direction Y) with the hook 44b engaged with the engaged member 12. Although detailed description is omitted here since the such a transfer mechanism that makes use of a hook or hooks (or a hook-type transfer mechanism) is well-known, the hook 44b has an engaging portion which can be inserted from below into the gap formed between the engaged member 12 and a side surface of the object 10 of paying of respects (box-shape portion 13). And the hook 44b can be switched between: an engaged state or position in which the hook 44b is in engagement with the engaged member 12 by vertically moving (or alternatively, rotating) the hook 44b to cause the engaging portion to be inserted into the gap; and a disengaged state or position in which the hook 44b is out of engagement with the engaged member 12 by vertically moving (or alternatively, rotating) the hook 44b to cause the engaging portion to be moved out of the gap. Note that the transfer device 44 may also include a conveyor mechanism (support and transport mechanism), or a clamping mechanism, etc. which can operate in cooperation with the hook-type transfer mechanism.

As shown in FIGS. 1-3, each second transport device 22 consists of a roller conveyor. Each second transport device 22 is configured to transport an object 10 of paying of respects along a horizontal direction (i.e., along the rack depth direction Y in the present embodiment). In other words, each second transport device 22 includes a roller-conveyor mechanism that is capable of transporting an object 10 of paying of respects while supporting it from below and that functions as a horizontal movement mechanism 30 configured to move an object 10 of paying of respects along a horizontal direction. As shown in FIG. 2, each second transport device 22 is configured to bidirectionally transport an object 10 of paying of respects between the corresponding relay area 4 (see FIG. 1) and the corresponding respects-paying area 6 with the plate-shaped member 3 facing (or located on) the respects-paying area 6 side. Note also that none of the second transport devices 22 includes any rotating mechanism for rotating an object 10 of paying of respect about an axis extending along the vertical direction Z, and that the first transport device 21 is configured to transfer, in a relay area 4, an object 10 of paying of respects to any of the second transport devices 22 with the plate-shaped member 3 facing the corresponding respects-paying area 6 side. On the other hand, the first transport device 21 is provided with a turntable 45 that can rotate the transfer device 44 about an axis extending along the vertical direction Z with respect to the vertically movable member 43. This arrangement makes it possible for the first transport device 21 to deliver an object 10 of paying of respects to any of the second transport devices 22 with the object 10 of paying of respects facing toward the corresponding respects-paying area 6 while allowing each object 10 of paying of respects to be stored in either of the pair of storage racks 60 (which face each other) such that its plate-shaped member 3 faces toward the travel path of the first transport device 21 (i.e., the side on which an object 10 of paying of respects is carried in and out of a storage section 61). Note that the first transport device 21 does not need to be provided with a turntable 45, for example, when each object 10 of paying of respects is stored in either of the pair of storage racks 60 in the same orientation as an object 10 of paying of respects placed in a respects-paying area 6.

Figure 4:
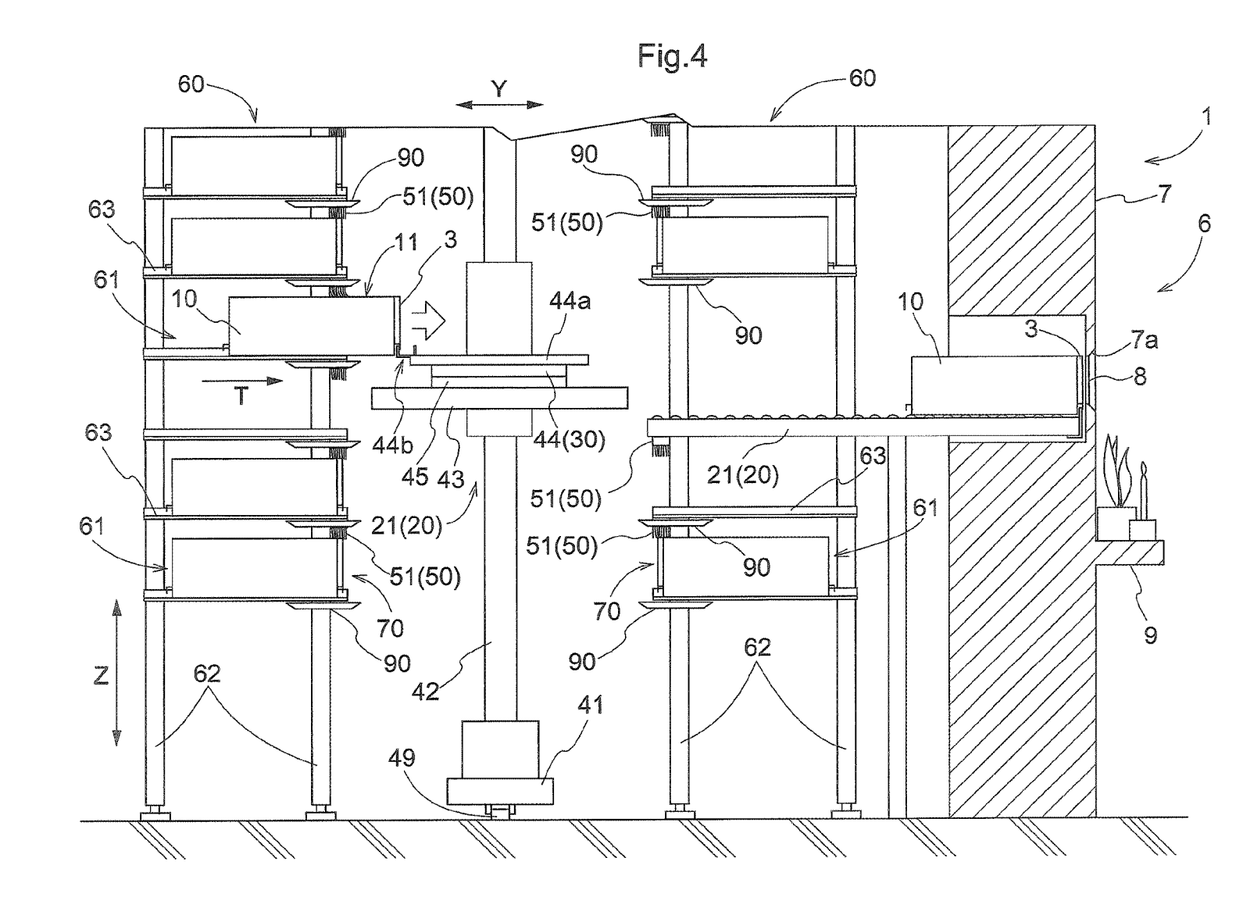
FIG. 4 is a side view of a storage facility for objects of paying of respects in accordance with the second embodiment.

In addition, a panel 7 with a gravestone pattern or decoration (for example, a granite pattern or design that imitates a gravestone surface) applied to, attached to, printed on, or otherwise shown on, its surface is provided in each respects-paying area 6. This panel 7 partitions off, or separates, an area in which the first transport device 21, the second transport devices 22, and the storage racks 60 are installed from an area for a person (visiting to pay respects) to pay respects in the corresponding respects-paying area 6. As shown in FIG. 2, an opening 7*a* is formed in an area of the panel 7 that is horizontally across (i.e., across along the rack depth direction Y) from an object 10 of paying of respects placed in the corresponding respects-paying area 6 so that a person visiting to pay respects can view the plate-shaped member 3 of the object 10 of paying of respects located in the respects-paying area 6 through this opening 7*a*. The opening 7*a* is formed to correspond in shape and dimensions to those of the plate-shaped member 3. In addition, the opening 7*a* is closed by a glass pane 8. For example, a sheet of glass with variable opacity which can be changed between a transparent state and a non-transparent state by changing the supply of electric energy may be used as the glass pane 8. In addition, an altar 9 on which incense sticks, an offering, etc., may be placed is provided below the opening 7*a* of the panel 7. Note that FIG. 2 shows a situation in which an object 10 of paying of respects is being transported toward a respects-paying area 6 by a second transport device 22 (i.e., situation in which the object 10 of paying of respects has not reached the respects-paying area 6), and that, when an object 10 of paying of respects is placed in the respects-paying area 6, it is so located that the surface of the plate-shaped member 3 is close to or adjacent the opening 7*a* as shown in FIG. 4 which depicts the second embodiment described below.

The structure of cleaning devices 50 which are an important part of the storage facility 1 in accordance with the present disclosure is described next. As shown in FIGS. 1-3, the storage facility 1 includes cleaning devices 50 each of which utilizes a dust removing member 51 to remove dust from an outer surface 11 (see FIG. 3) of an object 10 of paying of respects. Note that, in the present specification including claims, the verb "remove" should be understood to mean to get rid of at least a portion of the substance (i.e., dust) being removed. Each dust removing member 51 is provided at a position that allows it to act on (i.e., at a position at which it can act on) an outer surface 11 of the object 10 of paying of respects that is being moved in a transport direction T through the transport operation by the transport devices 20 (transport system) such that it is in relative motion in the direction opposite to the transport direction T with respect to the object 10 of paying of respects as the object 10 of paying of respects is moved in the transport direction T. More specifically, as shown in FIG. 3, each dust removing member 51 is a brush, and includes a brush body 51*b*, and a support portion 51*a* which supports the brush body 51*b*. The brush body 51*b* is a collection of bristles or filaments (for example, synthetic fibers, carbon fibers, a metal fibers, etc.) and the proximal end portion (one end portion of each bristle) of the brush body 51*b* is fixed to the support portion 51*a*. And each dust removing member 51 is so located that the distal end portion (other end portion of each bristle) of the brush body 51*b* can contact an outer surface 11 of an object 10 of paying of respects. In the description below, the distal end portion of the brush body 51*b* will be referred to as the distal end portion of the dust removing member 51.

Figure 8:
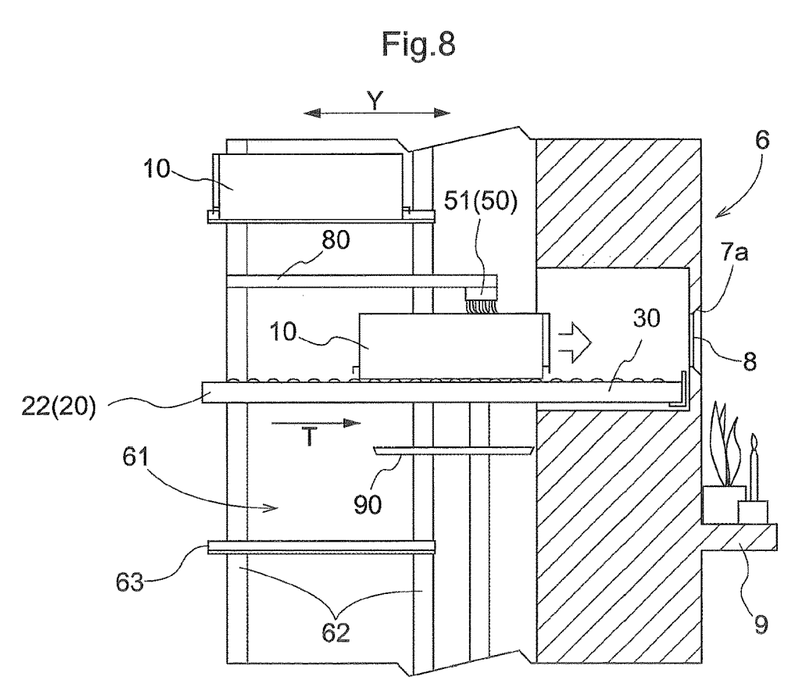
FIG. 8 is a side view of the storage facility for objects of paying of respects in accordance with another embodiment.

In the present embodiment, each dust removing member 51 is provided at a position that allows it to act on (contact in the present example) an outer surface 11 of the object 10 of paying of respects that is being moved in a transport direction T (along, or parallel to, the rack depth direction Y in the present example) toward the corresponding respects-paying area 6. More specifically, as shown in FIGS. 1 and 3, each dust removing member 51 is provided at such a position that the dust removing member 51 overlaps with the corresponding second transport device 22 as seen along the vertical direction Z and that the distal end portion of the dust removing member 51 is located at a lower height than the height of the top surface (upper outer surface 11) of an object 10 of paying of respects supported by the second transport device 22 (horizontal movement mechanism 30). In addition, each dust removing member 51 is fixed at a position that is not linked with the operation of the corresponding horizontal movement mechanism 30. More specifically, as shown in FIGS. 2 and 3, each dust removing member 51 is fixed to the storage rack 60 as a result of the fact that its support portion 51*a* is fixed to support members 80 which are in turn fixed to the support columns 62. As shown in FIGS. 1 and 2, the position of the dust removing member 51 along the rack depth direction Y is in a central portion in the horizontal range over which a storage section 61 extends along the rack depth direction Y. As such, in the present embodiment, a "position that is not linked with the operation of the corresponding horizontal movement mechanism 30" at which a dust removing member 51 is fixed is a fixed position that is not moved (more specifically a position in a storage rack 60). However, as in the third embodiment described below, such position may be a position on a movable member (more specifically position on the first transport device 21). In addition, the position of the dust removing member 51 along the rack depth direction Y as shown in FIGS. 1 and 2 is merely an example of such position. And the position of the dust removing member 51 along the rack depth direction Y may coincide with one end portion in the horizontal range over which a storage section 61 extends along the rack depth direction Y, or may be outside the horizontal range over which a storage section 61 extends along the rack depth direction Y. An example of the latter arrangement is an arrangement in which, as shown in FIG. 8, the dust removing member 51 is located between a storage section 61 and the respects-paying area 6 along the rack depth direction Y (i.e., on the respects-paying area 6 side of, or with respect to, the horizontal range over which a storage section 61 extends along the rack depth direction Y). While not shown, the dust removing member 51 may be located between a storage section 61 and the first transport device 21 along the rack depth direction Y (i.e., on the opposite side of the horizontal range (over which a storage section 61 extends along the rack depth direction Y) from the respects-paying area 6).

Because the dust removing member 51 is located as described above, the distal end portion of the dust removing member 51 comes into contact with the top surface of an object 10 of paying of respects as shown in FIGS. 2 and 3 when the object 10 of paying of respects (that is being moved by the transport operation of a second transport device 22 toward a respects-paying area 6) passes by (i.e., is caused to pass by) the location of the dust removing member 51. Thus, when the object 10 of paying of respects passes by the location of the dust removing member 51, the distal end portion of the dust removing member 51 slides on the top surface of the object 10 of paying of respects in the direction opposite to the transport direction T relative to the object 10 of paying of respects. The location of the dust removing member 51 along the transport direction T is fixed; so, the distal end portion of the dust removing member 51 moves in the direction opposite to the transport direction T relative to the object of paying of respects at the same speed as the transport speed of the object 10 of paying of respects in the transport direction T. Thus, it is made possible to remove any dust which may exist on the top surface of an object 10 of paying of respects transported toward a respects-paying area 6 with the dust removing member 51 by adopting the arrangement in which the distal end portion of the dust removing member 51 slides on the top surface of an object 10 of paying of respects (that is being moved toward a respects-paying area 6) in the direction opposite to the direction of the transport direction T of the object 10 of the paying of respects relative to the object 10 of the paying of respects (i.e., by adopting an arrangement in which the point of action of the dust removing member 51 against the outer surface 11 of an object 10 of paying of respects moves (i.e., is in relative motion) in the direction opposite from the transport direction T of the object 10 of paying of respects relative to the object 10 of paying of respects). As shown in FIG. 2, a receiving member 90 which receives any dust removed from the top surface of an object 10 of paying of respects is provided in or below the location of the dust removing member 51. And dust removed from top surfaces of objects 10 of paying of respects is collected in, for example, a dust collector that may be integrally, or separately, provided with the receiving member 90. Each receiving member 90 is located in a position which is below an object 10 of paying of respects passing by the location of the corresponding dust removing member 51 and in which the receiving member 90 overlaps with the corresponding dust removing member 51 as seen along the vertical direction. Each receiving member 90 is fixed to a storage rack 60. A member with a thin flat portion with its peripheral portion curved upward (i.e. pan-shaped) may be used as a receiving member 90. Note that the width of the brush body 51b along a horizontal direction perpendicular to the transport direction T (i.e., along the rack lateral direction X in the present example) is preferably the same as, or greater than, the width of an object 10 of paying of respects along that same horizontal direction in its orientation as it passes by the location of the dust removing member 51.

FIG. 2 shows a situation in which an object 10 of paying of respects is being transported toward a respects-paying area 6 by a second transport device 22 (i.e., a situation in which the transport direction T is along (i.e., parallel to) the rack depth direction Y and is directed from the relay area 4 (see FIG. 1) toward the respects-paying area 6). However, the distal end portion of the dust removing member 51 also comes into contact with the top surface of an object 10 of paying of respects as the object 10 of paying of respects passes by the location of the dust removing member 51 when an object 10 of paying of respects is transported toward the relay area 4 by the second transport device 22 (i.e., when the transport direction T is reversed from the direction shown in FIG. 2). This makes it possible to remove any dust which may exist on the top surface of an object 10 of paying of respects by the dust removing member 51 not only when the object 10 of paying of respects is moved to a respects-paying area 6 but also when it is moved out from the respects-paying area 6.

Second Embodiment

The second embodiment of a storage facility for objects of paying of respects is described next with reference to a drawing (FIG. 4). In the following description, the focus is placed on the differences between a storage facility for objects of paying of respects in accordance with the present embodiment and one in the first embodiment. Any features of the present embodiment that are not explicitly discussed in this section should be understood to be identical to those in the first embodiment without further discussion and will be indicated by the same reference numerals as those used in the first embodiment.

In the present embodiment, the dust removing member 51 is provided at a position that allows it to act on (or, in the present example, contact) an outer surface 11 of an object 10 of paying of respects that is being moved along a horizontal direction as the transport device 20 retrieves the object 10 of paying of respects from a storage section 61. More specifically, as shown in FIG. 4, each dust removing member 51 is fixed to the corresponding storage section 61 so that it is located in the entrance area 70 for allowing an object 10 of paying of respects to be stored in and retrieved from the storage section 61. Each dust removing member 51 is fixed to the support arms 63 that define the upper end of the corresponding storage section 61 in which an object 10 of paying of respects from which dust is to be removed is stored (referred to hereinafter as an "target storage section"). The entrance area 70 is a front end portion of the storage section 61 (on the side of the transporting path of the first transport device 21 along the rack depth direction Y). And each dust removing member 51 is provided at such a position that the distal end portion of the dust removing member 51 is located at a lower height than the height (vertical position) of the top surface (reference height) of an object 10 of paying of respects stored in a target storage section (i.e., supported by the support arms 63). In an example shown FIG. 4, when an object 10 of paying of respects is stored in a storage section 61, the distal end portion of each dust removing member 51 is in contact with the end portion, along the rack depth direction Y, of the object 10 of paying of respects (i.e. with the end portion on the side of the transporting path of the first transport device 21). In a case where the vertical position of an object 10 of paying of respects when passing by the location of a dust removing member 51 is higher than its vertical position when stored in the storage section, the reference height may be set to be the vertical position of the upper surface of an object 10 of paying of respects when passing by the location of a dust removing member 51.

Since each dust removing member 51 is located as described above, as shown in FIG. 4, the distal end portion of a dust removing member 51 comes into contact with the top surface of an object 10 of paying of respects as an object 10 of paying of respects (being moved in the transport direction T toward outside the storage section 61 through the transport operation (retrieval operation) of the first transport device 21) passes by the location of the dust removing member 51. Therefore, the distal end portion of a dust removing member 51 slides on the top surface of an object 10 of paying of respects in the direction opposite to the transport direction T of an object 10 of paying of respects relative to the object 10 of paying respects as it passes by the location of the dust removing member 51. Because the object 10 of paying of respects retrieved from a storage section 61 is transported to a respects-paying area 6, any dust which may exist on the top surface of an object 10 of paying of respects that is being transported to a respects-paying area 6 can be removed by a dust removing member 51 in the present embodiment (as with the aforementioned first embodiment). Note that, as shown in FIG. 4, a receiving member 90 is provided for each dust removing member 51 so that the same number of receiving members 90 are provided as the number of dust receiving members 51. And each receiving member 90 is located in a position which is below an object 10 of paying of respects passing by the location of the corresponding dust removing member 51 and in which the receiving member 90 overlaps with the corresponding dust removing member 51 as seen along the vertical direction. For a dust removing member 51 for a target storage section that is a storage section 61 that is not in the lowest horizontal row of storage sections 61, the corresponding receiving member 90 is located above an object 10 of paying of respects stored in a storage section 61 under the storage section 61 that corresponds to the dust removing member 51.

FIG. 4 shows a situation in which an object 10 of paying of respects is being retrieved from a storage section 61 by the first transport device 21 (i.e., a situation in which the transport direction T is along the rack depth direction Y and is directed toward the front side of the storage rack 60). However, the distal end portion of the dust removing member 51 also comes into contact with the top surface of an object 10 of paying of respects as an object 10 of paying of respects passes by the location of the dust removing member 51 when an object 10 of paying of respects is moved into the storage section 61 by the first transport device 21 (i.e., when the transport direction T is reversed from the direction shown in FIG. 4). Therefore, it is possible to remove any dust which may exist on the top surface of an object 10 of paying of respects with a dust removing member 51 not only when the object 10 of paying of respects is retrieved from a storage section 61 but also when the object 10 of paying of respects is moved into a storage section 61.

Note that the transfer device 44 includes a mechanism configured to move an object 10 of paying of respects along a horizontal direction (a mechanism that projects and retracts the hook 44b in the present example). And the first transport device 21 uses or utilizes such a mechanism to retrieve an object 10 of paying of respects out of a storage section 61, and to store, or move, an object 10 of paying of respects into a storage section 61. When a horizontal movement mechanism 30 is defined to be a mechanism configured to move an object 10 of paying of respects along a horizontal direction by and around the location of a dust removing member 51, a horizontal movement mechanism 30 is not provided to any of the second transport devices 22 but is provided to the first transport device 21 (i.e., transfer device 44) in the present embodiment. Although the horizontal movement mechanism 30 of the present embodiment is different in structure from that in the first embodiment described above, the mechanisms in these embodiments are both a mechanism configured to move an object 10 of paying of respects along a horizontal direction; thus, the same reference numeral "30" is used for these as a horizontal movement mechanism since each dust removing member 51 is fixed to the corresponding storage section 61 (storage rack 60) in the present embodiment as with the first embodiment described above, each dust removing member 51 is fixed at a position that is not linked with the operation of the corresponding horizontal movement mechanism 30 in the present embodiment.

Third Embodiment

Figure 5:
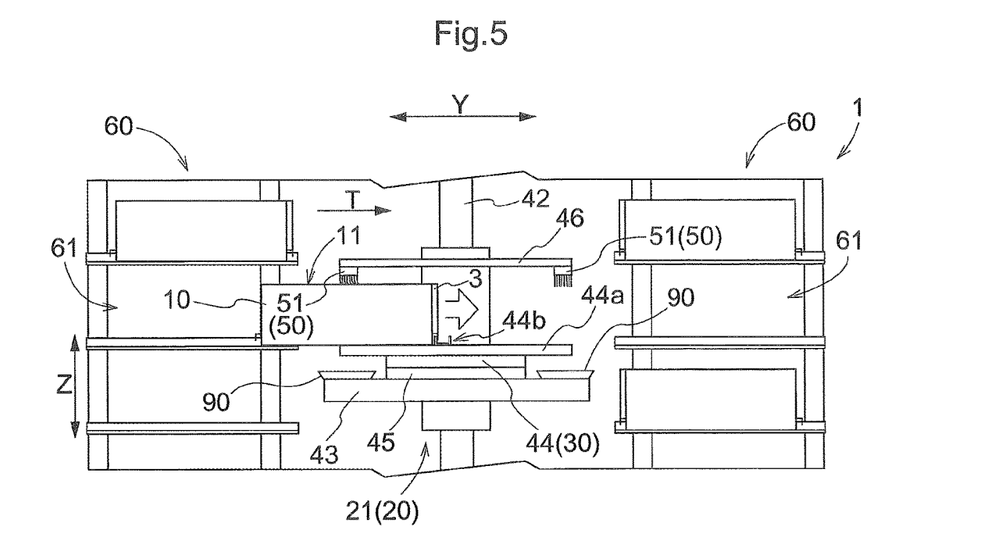
FIG. 5 is a side view of a storage facility for objects of paying of respects in accordance with the third embodiment.
Figure 6:
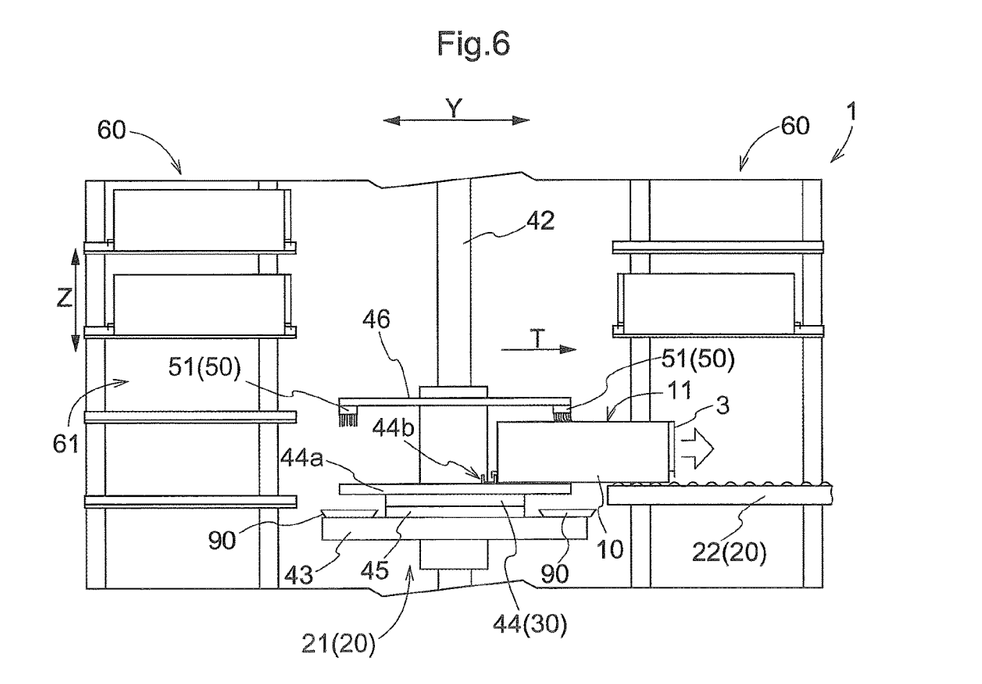
FIG. 6 is a side view of the storage facility for objects of paying of respects in accordance with the third embodiment.

The third embodiment of a storage facility for objects of paying of respects is described next with reference to the drawings (FIGS. 5 and 6). In the following description, the focus is placed on the differences between a storage facility for objects of paying of respects in accordance with the present embodiment and one of the first embodiment. Any features of the present embodiment that are not explicitly discussed in this section should be understood to be identical to those in the first embodiment without further discussion and will be indicated by the same reference numerals as those used in the first embodiment.

In the present embodiment, the dust removing members 51 are provided to the first transport device 21. More specifically, as shown in FIGS. 5 and 6, the first transport device 21 includes a fixed member 46 which is provided at a fixed distance, along the vertical direction Z, from the support member 44a. And each dust removing member 51 is fixed to this fixed member 46. And each dust removing member 51 is provided at such a position that the dust removing member 51 overlaps with the support member 44a as seen along the vertical direction Z and that the distal end portion of the dust removing member 51 is located at a lower height than the height (reference height) of the top surface of an object 10 of paying of respects supported by the support member 44a. In a case where the vertical position of an object 10 of paying of respects when passing by the location of the dust removing member 51 is higher than its vertical position when supported by the support member 44a, the reference height may be set to be the vertical position of the upper surface of an object 10 of paying of respects when passing by the location of a dust removing member 51. The transfer device 44 is configured to be capable of transferring an object 10 of paying of respects to transfer target locations on both sides of the transfer device 44 along the rack depth direction Y. Accordingly, two dust removing members 51 are provided with one on each side with respect to a central portion, along the rack depth direction Y, of the transfer device 44. Note that, as shown in FIGS. 5 and 6, two receiving members 90 are provided with one receiving member 90 provided for each dust removing member 51. Each of the two receiving members 90 is located at a position which is below an object 10 of paying of respects passing by the location of the corresponding dust removing member 51 and at which the receiving member 90 overlaps with the corresponding dust removing member 51 as seen along the vertical direction. Each receiving member 90 is fixed on a top surface of the vertically movable member 43. An arrangement may be adopted in which the two receiving members 90 are integrated into one receiving member 90 so that one shared receiving portion 90 would be provided for both of the two dust removing members 51.

Since each dust removing member 51 is located as described above, each dust removing member 51 is located at a position that allows the dust removing member 51 to act on (or, in the present example, contact) the top surface of an object 10 of paying of respects that is being moved along a horizontal direction, when the object 10 of paying of respects is retrieved from a storage section 61 through the retrieval operation of the first transport device 21. In other words, as shown in FIG. 5, the distal end portion of a dust removing member 51 comes into contact with the top surface of an object 10 of paying of respects as the object 10 of paying of respects (being moved in the transport direction T toward outside the storage section 61 through the transport operation (retrieval operation) of the first transport device 21) passes by the location of the dust removing member 51. Therefore, the distal end portion of a dust removing member 51 slides on the top surface of an object 10 of paying of respects in the direction opposite to the transport direction T of an object 10 of paying of respects relative to the object 10 of paying respects as it passes by the location of the dust removing member 51. Because the object 10 of paying of respects retrieved from a storage section 61 is transported to a respects-paying area 6, any dust which may exist on the top surface of an object 10 of paying of respects that is being transported to a respects-paying area 6 can be removed by a dust removing member 51 in the present embodiment (as with the aforementioned first embodiment). While not described in detail, it is possible to remove any dust which may exist on the top surface of an object 10 of paying of respects with a dust removing member 51 not only when the object 10 of paying of respects is retrieved from a storage section 61 but also when the object 10 of paying of respects is moved into a storage section 61.

In addition, because each dust removing member 51 is located as described above, each dust removing member 51 is provided at a position that allows it to act on (or, in the present example, contact) the outer surface 11 of an object 10 of paying of respects that is being moved along a horizontal direction toward a respects-paying area 6 as the object 10 of paying of respects is transferred from the first transport device 21 to a second transport device 22. In other words, as shown in FIG. 6, as an object 10 of paying of respects (that is being moved toward a respects-paying area 6 through the transport operation of the first transport device 21 (which may include a transport operation performed in cooperation with a second transport device 22)) passes by the location of a dust removing member 51, the distal end portion of the dust removing member 51 comes into contact with the top surface of an object 10 of paying of respects. Thus, it is possible to remove any dust which may exist on the top surface of an object 10 of paying of respects that is being transported to a respects-paying area 6 with a dust removing member 51 when transferring the object 10 of paying of respects from the first transport device 21 to a second transport device 22. While not described in detail, it is possible to similarly remove any dust which may exist on the top surface of an object 10 of paying of respects not only when the object 10 of paying of respects is transferred from the first transport device 21 to a second transport device 22 but also when the object 10 of paying of respects is transferred from a second transport device 22 to the first transport device 21.

When a horizontal movement mechanism 30 is defined to be a mechanism configured to move an object 10 of paying of respects along a horizontal direction by and around the location of a dust removing member 51, a horizontal movement mechanism 30 is not provided to any of the second transport devices 22 but is provided to the first transport device 21 (i.e., transfer device 44) in the present embodiment, as with the second embodiment described above. And in the present embodiment, each dust removing member 51 is fixed at a position or portion of a transport device 20 (the first transport device 21 in the present example) that is not linked with the operation of any horizontal movement mechanism 30 in the present embodiment.

Other Embodiments

Other embodiments of a storage facility for objects of paying of respects are described next.

Figure 7:
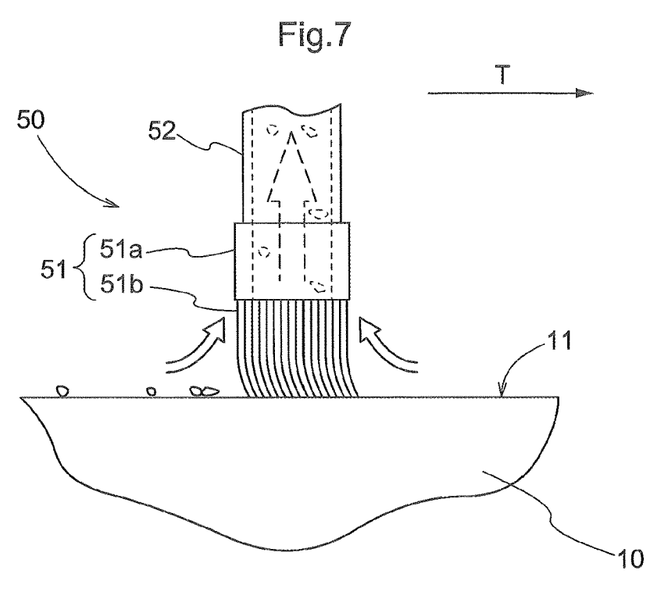
FIG. 7 shows how a cleaning in accordance with another embodiment operates.

(1) In each embodiment described above, an example is described in which each cleaning device 50 has only a dust removing member 51. However, the invention is not limited to such an arrangement. As with an example shown in FIG. 7, in addition to dust removing member 51, a cleaning device 50 may include a vacuum device 52 located adjacent to the dust removing member 51 to draw in dust removed from an outer surface 11 of an object 10 of paying of respects by the dust removing member 51. While not described in detail, air drawn in by the vacuum device 52 may be, for example, discharged to outside the vacuum device 52 after dust is removed by a filter. Note that, while FIG. 7 shows an example arrangement in which the vacuum device 52 (more specifically, the mouth of the vacuum device 52) is connected to the dust removing member 51, the vacuum device 52 (or the mouth of the vacuum device 52) may be located adjacent to the dust removing member 51 along the transport direction T (e.g., adjacent to, and on an upstream side of, the dust removing member 51 with respect to the transport direction T).

(2) In each embodiment described above, an example is described in which each dust removing member 51 removes dust from the top surface of an object 10 of paying of respects. However, the invention is not limited to such an arrangement. A dust removing member 51 may be configured to remove dust from, in addition to the top surface of an object 10 of paying of respects, at least one of the two side surfaces which face toward respective horizontal directions that are perpendicular to the transport direction T (i.e., two side surfaces with no engaged member 12 provided thereto). In such a case, such a dust removing member 51 would be provided to act on both the top surface and one or more side surfaces of an object 10 of paying of respects that is being moved in the transport direction T through the transport operation of the transport device 20. In such a case, such a dust removing member 51 may include one or more brush bodies 51b that can come into contact with the one or more side surfaces of an object 10 of paying of respect, in addition to the brush body 51b that can come into contact with the top surface of an object 10 of paying of respects. Also, a dust removing member 51 may be provided to act only on one or more side surfaces of an object 10 of paying of respects that is being moved in the transport direction T through the transport operation of the transport device 20.

(3) In each embodiment described above, an example is described in which the brush body 51b of each dust removing member 51 is a collection of bristles. However, the invention is not limited to such an arrangement. The brush body 51b may include, or consist of, a sheet member or a plurality of sheet members. In addition, in an embodiment described above, the support portion 51a of each dust removing member 51 is fixed to the support members 80. However, a support portion 51a for supporting the brush body 51b may be a shaft that is supported by the support members 80 or other members such that the shaft can be rotated about a horizontal axis that is perpendicular to the transport direction T. And the support portion 51a may be driven and rotated to rotate the brush body 51b as an object 10 of paying of respects passes by the location of the dust removing member 51. In other words, the dust removing member 51 may include a rotatable brush. Alternatively, it is also possible to adopt an arrangement in which the brush body 51b is oscillated or moved back and forth when an object 10 of paying of respects passes by the location of the dust removing member 51, or an arrangement in which the brush body 51b is rotated about an axis extending along the vertical direction Z when an object 10 of paying of respects passes by the location of the dust removing member 51. Further, an arrangement may be adopted in which a brush body 51b is movable within a range allowed by deformation (e.g., stretching and contracting, etc.) of an urging member, such as a coil spring so that the brush body 51b is moved (from its initial position) in at least one of a vertical direction Z, the transport direction T, and a horizontal direction perpendicular to the transport direction T, as a result of the brush body 51b coming into contact with an object 10 of paying of respects passing by the location of a dust removing member 51. In such a case, the brush body 51b would be returned to its initial position by the urging force of the urging member, or under gravity, etc., after the object 10 of paying of respects has passed by the location of the dust removing member 51.

(4) In each embodiment described above, an example is described in which each dust removing member 51 is a brush. However, the invention is not limited to such an arrangement. A dust removing member 51 may be a member other than a brush. For example, a dust removing member 51 may be an elastic member formed of a sponge, or rubber, etc., so that dust is removed from an outer surface 11 of an object 10 of paying of respects as a result of the elastic member sliding on the outer surface 11. The elastic member may be shaped into, for example, a general shape of a blade (i.e., flat and thin (thickness less than width and length)). Alternatively, a dust removing member 51 may include one or more pieces of fabric such as nonwoven fabric so that dust is removed from an outer surface 11 of an object 10 of paying of respects as a result of the fabric sliding on the outer surface 11.

In addition, a dust removing member 51 may be such that it does not slide on the outer surface 11 of an object 10 of paying of respects. For example, a dust removing member 51 may be a rotatable member that can collect dust by its adhesive nature and/or static electricity so that dust is removed from an outer surface 11 of an object 10 of paying of respects as a result of the rotatable member rotating in contact with the outer surface 11. Alternatively, a dust removing member 51 may be a gas ejecting member (nozzle) of a gas ejection device which ejects gas (e.g., compressed air etc.). And dust may be removed from an outer surface 11 of an object 10 of paying of respects as a result of a point of application (the location of the ejection of the gas) against the outer surface 11 being moved relative to the object 10 of paying of respects.

Note that each cleaning device 50 may include a plurality of types of dust removing members 51 (such as, a brush body 51b and a gas ejecting member).

(5) In each embodiment described above, an example is described in which an object 10 of paying of respects is a container which has a general outer shape of a rectangular parallelepiped. The invention is not limited to such arrangement. Each object 10 of paying of respects may be a container which is for holding, or configured to hold, one or more housed objects 2 such as cremated remains or a funerary urn but which does not have a general outer shape of a rectangular parallelepiped. For example, an object 10 of paying of respects may be a container which is shaped to resemble a building for religious purposes, such as a temple, shrine, or cathedral, or may be a container which has an outer shape of an object of worship or prayer, such as, Christ, Buddha, a bodhisattva (e.g., Kshitigarbha, a guardian deity of children, etc.) or a religious saint or personage. In addition, a thing or material that is placed over a "housed object 2" from above (a thing or material that covers an object or material 2 from above and sides) is also considered to fall within the meaning of a container as used in the present specification. In addition, an object 10 of paying of respects does not have to be and may not be a container. For example, an object 10 of paying of respects may be a mortuary tablet, or a statue of Buddha, Christ or Mary, etc., as described above. Therefore, an object 10 of paying of respects may be an object (such as cremated remains or a funerary urn containing cremated remains, etc.) representing one (such as the deceased, etc.) being paid respects to, or may be a container for containing, or configured to contain, such object.

(6) In each embodiment described above, an example is described in which the transfer device 44 provided to the first transport device 21 is provided with a hook-type transfer mechanism. However, the invention is not limited to such an arrangement. The arrangement may be such that the transfer device 44 is not provided with a hook-type transfer mechanism. For example, the transfer device 44 may be provided with a slide-out mechanism which can project and retract a support member (primary support member) which can support an object 10 of paying of respects from below so that an object 10 of paying of respects can be transferred between the transfer device 44 and a transfer target location by vertically moving the transfer device 44 (vertically movable member 43) with the support member projected toward the transfer target location. When, as described, the transfer device 44 does not have a hook-type transfer mechanism, the engaged member 12 does not need to be provided to an outer surface of side wall portions of an object 10 of paying of respects.

(7) In each embodiment described above, an example is described in which the first transport device 21 is a stacker crane. However, the invention is not limited to such an arrangement. The first transport device 21 may be transport device other than a stacker crane such as a ceiling, or overhead, transport vehicle which travels along a railed track (travel path) formed on the ceiling side to transport an article, or an article transport vehicle which can travel autonomously on the floor surface while sensing, or otherwise learning, its own current position. In addition, in each embodiment described above, an example is described in which a rotating mechanism (turntable 45) which rotates an object 10 of paying of respects about an axis extending along the vertical direction Z is provided to the first transport device 21. However, such a rotating mechanism may be provided instead to each second transport device 22 or at other location.

(8) In each embodiment described above, an example is described in which each second transport device 22 consists of a roller conveyor. However, the invention is not limited to such an arrangement. A second transport device 22 may consist of a transport mechanism other than a roller conveyor, such as a belt conveyor or a slat conveyor.

(9) In each embodiment described above, an example is described in which a transport system is formed by two transport devices (a first transport device 21 and a second transport device 22) so configured that an object 10 of paying of respects can be transferred between them. However, the invention is not limited to such an arrangement. The transport system may be formed by a single transport device or may be formed by three or more transport devices so configured that an object 10 of paying of respects can be transferred between them. As an example of the transport system being formed by a single transport device, the transport system may include only the first transport device 21 described in each of the embodiments described above. That is, the transport system may be a stacker crane. In such a case, the stacker crane that functions as the transport system may be configured to transfer an object 10 of paying of respects directly to a respects-paying area 6 (more specifically to a support portion for an object 10 of paying of respects provided to correspond to a respects-paying area 6).

In other words, a stationary support portion may be provided in place of a second transport device 22. In such an arrangement, it would be preferable to provide a removing member 51 at a position that allows it to act on an outer surface of an object 10 of paying of respects that is being moved to the stationary support portion from the first transport device 21 (i.e., at a position that allows it to act on an outer surface of an object 10 of paying of respects that is being moved horizontally toward the stationary support portion). For example, a dust removing member 51 can be arranged to act on the outer surface 11 of an object 10 of paying of respects that is being transferred to the stationary support portion by positioning the dust removing member 51 between, along the rack depth direction Y, a storage section 61 (storage section 61 located on the side of a respects paying area 6 with respect to the first transport device 21) and a central point of the first transport device 21 along the rack depth direction Y, as with the arrangement in the third embodiment described above (see FIGS. 5 and 6).

(10) In each embodiment described above, an example is described in which each storage section 61 is configured to store one object 10 of paying of respects. However, the invention is not limited to such an arrangement. The arrangement may be such that each storage section 61 stores a plurality of objects 10 of paying of respects (for example, two objects 10 of paying of respects) one placed next to another along the rack depth direction Y. In addition, an example is described in each of the embodiments described above in which two storage racks 60 are so located to face each other across the transporting path of the first transport device 21. However, the arrangement may be such that a rack 60 may be provided on only one side of the transporting path (one side along the rack depth direction Y) of the first transport device 21.

(11) Note that an arrangement disclosed in any of the embodiments described above can also be used in combination with any arrangement disclosed in any other embodiment unless inconsistency arises. This applies to any combination of embodiments which are described as "other embodiments". Regarding any other arrangements and features, the embodiments disclosed in the present description are provided for the purposes of illustration only regarding all aspects. Therefore, it is possible to make various suitable changes without departing from the spirit of the present disclosure.

SUMMARY OF EMBODIMENTS DESCRIBED ABOVE

A brief summary of the storage facility for objects of paying of respects described above is provided next.

A storage facility for objects of paying of respects comprises a plurality of storage sections each configured to store an object of paying of respects; a transport system configured to transport an object of paying of respects between any of the plurality of storage sections and a respects-paying area which includes an area for a person, visiting to pay respects, to pay respects; a cleaning device which utilizes a dust removing member to remove dust from an outer surface of an object of paying of respects; and wherein the dust removing member is provided at a position that allows the dust removing member to act on an outer surface of an object of paying of respects that is being moved in a transport direction through transport operation by the transport system such that the dust removing member is in relative motion, in a direction opposite to the transport direction, with respect to the object of paying of respects as the object of paying of respects is moved in the transport direction.

With such an arrangement, the dust removing member provided at the position that allows it to act on an outer surface of an object of paying of respects is arranged to be in relative motion, in the direction opposite to the transport direction, with respect to the object of paying of respects as the object of paying of respects is caused to pass by the location of the dust removing member in the transport direction. Thus, the transporting of the object of paying of respects by the transport system can be made use of effectively to remove dust from an outer surface of an object of paying of respects. In this process, it is not necessary to move the dust removing member in the direction opposite to the transport direction. And even when the dust removing member is arranged to be moved, the amount of required movement can be made relatively small; thus, it is possible to remove dust from an outer surface of an object of paying of respects with a relatively simple arrangement.

Note that, with the arrangement described above, it is necessary to transport an object of paying of respects in order to remove dust from an outer surface of the object of paying of respects. However, at least when a person is visiting to pay respects, a corresponding object of paying of respects is transported from a storage section to a respects-paying area, and is transported to a storage section from the respects-paying area when the person finishes paying respects. Thus, dust can be removed from an outer surface of an object of paying of respects taking advantage of such a transporting opportunity. That is, although a small amount of dust may accumulate on an outer surface of an object of paying of respects while being stored in a storage section, such dust can be removed every time a person visits to pay respects. At least when a person visits to pay respects, likelihood of having an object of paying of respects with dust accumulated on an outer surface thereof can be reduced.

As such, with the arrangement described above, a storage facility for objects of paying of respects can be provided in which it is possible to reduce accumulation of dust on an outer surface of an object of paying of respects with a relatively simple arrangement.

Here, the dust removing member is preferably provided at a position that allows the dust removing member to act on an outer surface of the object of paying of respects that is being moved in a horizontal direction toward the respects-paying area.

With such an arrangement, an object of paying of respects can be transported to the respects-paying area after dust has been removed from an outer surface by the dust removing member. In other words, because an object of paying of respects can be transported to the respects-paying area after dust that has accumulated while being stored in a storage section has been removed, the likelihood of an object of paying of respects being seen by a person (visiting to pay respects) with dust accumulating on its outer surface can be reduced, thus allowing the dignity of the deceased to be properly maintained.

In an arrangement in which the dust removing member is provided at a position that allows the dust removing member to act on an outer surface of the object of paying of respects that is being moved in a horizontal direction toward the respects-paying area, the transport system preferably includes a horizontal movement mechanism configured to move an object of paying of respects along the horizontal direction, wherein the dust removing member is preferably fixed at a position that is not linked with operation of the horizontal movement mechanism.

With such an arrangement, efficiency in removing dust from the outer surface of an object of paying of respects can be improved as a result of the dust removing member properly in a relative motion, in the direction opposite to the transport direction, with respect to the object of paying of respects.

In addition, the dust removing member is preferably provided at a position that allows the dust removing member to act on an outer surface of an object of paying of respects that is being moved along a horizontal direction as the transport system retrieves the object of paying of respects from a storage section.

With such an arrangement, since dust can be removed from the outer surface of an object of paying of respects when retrieving the object of paying of respects from a storage section, the object of paying of respects can be transported to the respects-paying area after dust that has accumulated while being stored in the storage section has been removed. Thus, the likelihood of an object of paying of respects being seen by a person (visiting to pay respects) with dust accumulating on its outer surface can be reduced, thus allowing the dignity of the deceased to be properly maintained.

As such, in an arrangement in which the dust removing member is provided at a position that allows the dust removing member to act on an outer surface of an object of paying of respects that is being moved along a horizontal direction as the transport system retrieves the object of paying of respects from a storage section, the dust removing member is preferably fixed to a storage section so as to be located in an entrance area thereof for allowing an object of paying of respects to be stored in and retrieved from the storage section.

With such an arrangement, the area (of the outer surface of an object of paying of respects) on which the dust removing member acts when retrieving the object of paying of respects from the storage section can be made larger compared with a case in which the dust removing member is located toward the deeper end side of the storage section than the entrance area. Thus efficiency in removing dust from an outer surface of an object of paying of respects can be improved.

In a storage facility for objects of paying of respects incorporating any of the arrangements described above, the cleaning device preferably includes a vacuum device which is located adjacent to the dust removing member and which is configured to draw in dust removed from an outer surface of an object of paying of respects by the dust removing member.

With such an arrangement, the amount of dust removed from an outer surface of an object of paying of respects that may spread into the surrounding area can be reduced. As a result, dust can be removed from an outer surface of an object of paying of respects while reducing the amount of removed dust that can adhere to outer surfaces of other objects of paying of respects.

It is considered to be sufficient for the storage facility for object(s) of paying of respects in accordance with the disclosure to perform at least one of the results or effects described above.

What is claimed is:

1. A storage facility for objects of paying of respects comprising:
    a plurality of storage sections each configured to store an object of paying of respects;
    a transport system configured to transport an object of paying of respects between any of the plurality of storage sections and a respects-paying area which includes an area for a person, visiting to pay respects, to pay respects; and
    a cleaning device which utilizes a dust removing member to remove dust from an outer surface of an object of paying of respects;
    wherein the transport system includes a first transport device,
    the first transport device including:
        a travel member;
        a mast arranged vertically on the travel member;
        a vertically movable member movable along a vertical direction while being guided by the mast; and
        a transfer device supported by the vertically movable member and transferring an object of paying of respects to or from a transfer target location,
    wherein the transfer device includes a horizontal movement mechanism configured to move an object of paying of respects along a horizontal direction, and
    wherein the dust removing member is provided at a position that allows the dust removing member to act on an outer surface of an object of paying of respects that is being moved in a transport direction through transfer operation by the transfer device using the horizontal movement mechanism such that the dust removing member is in relative motion, in a direction opposite to the transport direction, with respect to the object of paying of respects as the object of paying of respects is moved in the transport direction.

2. The storage facility for objects of paying of respects as defined in claim 1, wherein
    the dust removing member is provided at a position that allows the dust removing member to act on an outer surface of the object of paying of respects that is being moved in a horizontal direction toward the respects-paying area.

3. The storage facility for objects of paying of respects as defined in claim 2, wherein
    the dust removing member is fixed at a position that is not linked with operation of the horizontal movement mechanism.

4. The storage facility for objects of paying of respects as defined in claim 1, wherein
    the dust removing member is provided at a position that allows the dust removing member to act on an outer surface of an object of paying of respects that is being moved along a horizontal direction as the first transport device retrieves the object of paying of respects from a storage section.

5. The storage facility for objects of paying of respects as defined in claim 4, wherein
    the dust removing member is fixed to a storage section so as to be located in an entrance area thereof for allowing an object of paying of respects to be stored in and retrieved from the storage section.

6. The storage facility for objects of paying of respects as defined in claim 1, wherein
    the cleaning device includes a vacuum device which is located adjacent to the dust removing member and which is configured to draw in dust removed from an outer surface of an object of paying of respects by the dust removing member.

7. The storage facility for objects of paying of respects as defined in claim 1, wherein the dust removing member is provided to the first transport device.

8. The storage facility for objects of paying of respects as defined in claim 7, wherein the transfer device includes a support member for supporting an object of paying of respects from below, and
   wherein the dust removing member is fixed to a fixed member provided at a fixed distance along the vertical direction from the support member.

\* \* \* \* \*